United States Patent
Rechtsman et al.

(10) Patent No.: US 12,399,312 B2
(45) Date of Patent: Aug. 26, 2025

(54) RECURSION-BASED DESIGN FOR SUPPRESSING INTER-FIBER CROSS-TALK IN MULTI-CORE FIBERS

(71) Applicant: THE PENN STATE RESEARCH FOUNDATON, University Park, PA (US)

(72) Inventors: Mikael Caleb Rechtsman, Boalsburg, PA (US); Jonathan Guglielmon, State College, PA (US); Kevin Peng Chen, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 895 days.

(21) Appl. No.: 17/595,748

(22) PCT Filed: Jun. 26, 2020

(86) PCT No.: PCT/US2020/039747
§ 371 (c)(1),
(2) Date: Nov. 23, 2021

(87) PCT Pub. No.: WO2020/264248
PCT Pub. Date: Dec. 30, 2020

(65) Prior Publication Data
US 2022/0229224 A1    Jul. 21, 2022

Related U.S. Application Data

(60) Provisional application No. 62/868,627, filed on Jun. 28, 2019.

(51) Int. Cl.
*G02B 6/02* (2006.01)
*G02B 27/00* (2006.01)
*H04B 10/2507* (2013.01)

(52) U.S. Cl.
CPC ..... *G02B 6/02042* (2013.01); *G02B 27/0012* (2013.01); *H04B 10/2507* (2013.01)

(58) Field of Classification Search
CPC ............ G02B 6/02042; G02B 27/0012; H04B 10/2507
See application file for complete search history.

(56) References Cited

U.S. PATENT DOCUMENTS

| 8,811,787 B2 | 8/2014 | Feuer |
| 2002/0176677 A1 | 11/2002 | Kumar et al. |

(Continued)

FOREIGN PATENT DOCUMENTS

| CN | 101218659 A | * 7/2008 | ............... G02B 6/00 |
| CN | 115144962 A | * 10/2022 | ............ G02B 6/122 |
| ES | 2436873 A1 | 5/2012 | |

OTHER PUBLICATIONS

Jai et al, Nonlinear Light Propatation in Fractal Waveguide Arrays, Optical Express vol. 18, issue 14, pp. 14409-14415,( https://opg.optica.org/OE/fulltext.cfm?uri=oe-18-14-14409) (Year: 2010).*

(Continued)

*Primary Examiner* — Leslie C Pascal
(74) *Attorney, Agent, or Firm* — Buchanan Ingersoll & Rooney PC

(57) ABSTRACT

Embodiments relate to generating a configuration of waveguide propagation constants formed in a waveguide array system. The configuration of propagation constants can be made via a recursive detuning process that produces approximations to a fractal structure designed to maximally localize eigenstates of a waveguide array. The eigenstates being maximally localized enables strong suppression of crosstalk between the waveguides. Performing more detuning iterations can produce a configuration of propagation (Continued)

constants that better approximates the fractal structure and suppresses crosstalk over larger distances.

3 Claims, 15 Drawing Sheets

(56) References Cited

U.S. PATENT DOCUMENTS

2013/0156393 A1 6/2013 Kokubun et al.
2017/0315420 A1 11/2017 Watts et al.

OTHER PUBLICATIONS

Guglielmon, J., et al; Inducing Maximal Localization with Fractal Waveguide Arrays; Physical Review, 2019, pp. 063807-1 to 063807-9.
International Search Report and Written Opinion for PCT/US2020/039747, filed Jun. 26, 2020, dated Sep. 15, 2020.

* cited by examiner

RECURSION-BASED DESIGN FOR SUPPRESSING INTER-FIBER CROSS-TALK IN MULTI-CORE FIBERS

CROSS-REFERENCE TO RELATED APPLICATIONS

This application is a U.S. national stage application under 35 U.S.C. § 371 for International Patent Application No. PCT/US2020/039747, filed on Jun. 26, 2020, which is related to and claims the benefit of U.S. Provisional Application No. 62/868,627, filed on Jun. 28, 2019, the entire contents of which is incorporated herein by reference.

STATEMENT REGARDING FEDERALLY SPONSORED RESEARCH OR DEVELOPMENT

This invention was made with government support under Grant Nos. DMS1620218 and ECCS1509546 awarded by the National Science Foundation. The Government has certain rights in the invention.

FIELD OF THE INVENTION

Embodiments relate to generating a configuration of waveguide propagation constants in a waveguide array system, the configuration being made via a recursive detuning process that is designed to approximate a fractal structure that maximally localizes eigenstates ("supermodes") of a waveguide array.

BACKGROUND OF THE INVENTION

The ability to transmit light through an array of closely packed waveguides while minimizing interwaveguide coupling can be beneficial for applications related to discrete imaging and telecommunications, for example. In these contexts, each waveguide serves as an independent channel through which information is transmitted. Ideally, the waveguides are closely packed in order to maximize the amount of information that can be encoded into a given cross-sectional area of the array. Unfortunately, this leads to an increase in the mode overlap of adjacent waveguides causing them to couple and producing problematic interwaveguide crosstalk.

Examples of known systems and methods related to minimizing inter-waveguide coupling of optical fibers can be appreciated from U.S. Pat. No. 8,811,787, U.S. 2002/0176677, and U.S. 2013/0156393.

SUMMARY OF THE INVENTION

Embodiments relate to generating a configuration of waveguide propagation constants in a waveguide array system. The configuration can be made via a recursive detuning process that is designed to approximate a fractal structure (i.e., a fractal configuration of waveguide propagation constants), the fractal structure being a structure that maximally localizes eigenstates ("supermodes") of a waveguide array.

The waveguide array can be made from a plurality of waveguides. Each waveguide can have a core with a refractive index which differs from the surrounding material in which it is embedded. The surrounding material (a cladding) can have a refractive index which is either uniform throughout the region not occupied by the cores of the waveguides or varies spatially in this region. The plurality of waveguides can be embedded in a common cladding that is shared among all waveguides, or individual claddings can be used for each waveguide. Each waveguide can have a waveguide length and a waveguide propagation constant. The waveguide propagation constant for each waveguide can be defined by any one or combination of a refractive index of the core, a thickness (i.e., diameter) of the core, and a refractive index of the surrounding material.

The waveguide array can be composed of waveguides with propagation constants that are constant along the waveguide array length. The configuration of waveguide propagation constants can be designed to cause light propagating along the length of the waveguide array to propagate in a non-diffuse manner. The configuration of waveguide propagation constants can be formed by detuning the plurality of waveguides in an iterative manner (e.g., via recursive detuning), wherein each detuning iteration involves an adjustment of the propagation constants of the waveguides. By performing more detuning iterations, the structure (configuration of waveguide propagation constants) can be made to maintain non-diffuse propagation of light over increasingly larger propagation distances and to approach a fractal structure. The fractal structure is an idealization obtained by iterating the detuning procedure infinitely many times. The fractal structure can also be viewed as a structure designed to optimize an objective function, wherein the fractal structure maximizes localization of the eigenstates of the coupled waveguide array—i.e., the fractal structure is designed to maximally confine the eigenstates in space (so that the photons will propagate along the length of the waveguide array in a non-diffuse manner). The structure obtained by applying a finite number of detuning iterations is a structure that approximates the fractal structure. After terminating the detuning process after a finite number of iterations, the structure can be made arbitrarily large (i.e., may contain arbitrarily many waveguides) by repeating the unit cell (the basic unit of repetition in a lattice structure) many times in the transverse plane (the plane perpendicular to the waveguide longitudinal axis).

In an exemplary embodiment, a waveguide array includes: a plurality of waveguides. Each waveguide comprises a core embedded in a cladding adjacent the core. Each waveguide has a waveguide length and a waveguide propagation constant, the waveguide propagation constant for each waveguide being defined by any one or combination of a refractive index of the core, a thickness of the core, and a refractive index of the cladding. A configuration of waveguide propagation constants is formed in the transverse plane, each of the propagation constants in the configuration being uniform along a length of the waveguide array. The configuration of waveguide propagation constants causes light propagating along the length of the waveguide array to propagate in a non-diffuse manner. The configuration of waveguide propagation constants being formed by detuning the plurality of waveguides in an iterative manner, wherein each iteration includes an adjustment of the propagation constants of the plurality of waveguides. Increasing the number of iterations causes the waveguide array to maintain non-diffuse propagation of light over increasingly larger propagation distances and causes the configuration of waveguide propagation constants to approach a fractal structure, the fractal structure being a configuration of waveguide propagation constants that maximizes localization of the eigenstates of a waveguide array.

The plurality of waveguides includes at least three waveguides, each waveguide having a waveguide propagation constant and a waveguide length, wherein the waveguide propagation constant for each waveguide is uniform along the respective waveguide length.

In an exemplary embodiment, a communication system includes a data transmitter. The system further includes a waveguide array coupled to the data transmitter, the waveguide array comprising a plurality of waveguides. Each waveguide comprises a core embedded in a cladding adjacent the core. Each waveguide has a waveguide length and a waveguide propagation constant, the waveguide propagation constant for each waveguide being defined by any one or combination of a refractive index of the core, a thickness of the core, and a refractive index of the cladding. A configuration of waveguide propagation constants is formed in the transverse plane, each of the propagation constants in the configuration being uniform along a length of the waveguide array. The configuration of waveguide propagation constants causes light propagating along the length of the waveguide array to propagate in a non-diffuse manner. The configuration of waveguide propagation constants being formed by detuning the plurality of waveguides in an iterative manner, wherein each iteration includes an adjustment of the propagation constants of the plurality of waveguides. Increasing the number of iterations causes the waveguide array to maintain non-diffuse propagation of light over increasingly larger propagation distances and causes the configuration of waveguide propagation constants to approach a fractal structure, the fractal structure being a configuration of waveguide propagation constants that maximizes localization of the eigenstates of a waveguide array. The system further includes a data receiver coupled to the waveguide array.

In an exemplary embodiment, a method for iteratively designing an on-site energy structure in a medium that confines waves, such as electromagnetic waves or quantum mechanical wavefunctions, at lattice sites that couple to one another involves specifying a fractal structure by selecting parameters that define the fractal structure, the fractal structure being an idealized on-site energy structure designed to maximize localization of eigenstates in the medium. The method involves generating an approximation to the fractal structure by recursively detuning on-site energies of neighboring sites in the medium a finite number of times to generate an on-site energy structure in the medium that approximates the fractal structure. The method involves truncating the number of detuning iterations at a finite number that is sufficiently large to generate crosstalk suppression between sites in the medium at propagation distances or timescales required by a relevant technological application.

In some embodiments, the medium is a waveguide array having a plurality of waveguide cores and the on-site energies are deviations of the waveguide propagation constants from a reference value.

In some embodiments, recursively detuning the on-site energies involves adjusting the waveguide propagation constants by iteratively adjusting a refractive index of the waveguide cores, a thickness of the waveguide cores, and/or a refractive index of the cladding.

In some embodiments, the method involves multiple iterations of adjusting the refractive indices of the cores, the thicknesses of the cores, and/or the refractive indices of the claddings in order to generate an on-site energy structure that is a closer approximation to the fractal structure.

In some embodiments, the medium is a waveguide array comprising: at least three waveguides, each waveguide having a waveguide propagation constant and a waveguide length, wherein the method further involves causing the waveguide propagation constant of each waveguide to take on a value which is uniform along the respective waveguide length.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of various aspects of the present invention. The scope of the present invention is not limited by this description.

Referring to FIGS. 1-5, embodiments relate to generating a configuration of waveguide propagation constants constructed via a recursive detuning process performed on a waveguide array 100. The configuration of waveguide propagation constants yields a waveguide array with eigenstates (also called "supermodes" of the waveguide array) that influence the propagation of light through the waveguide array.

Figure 3:
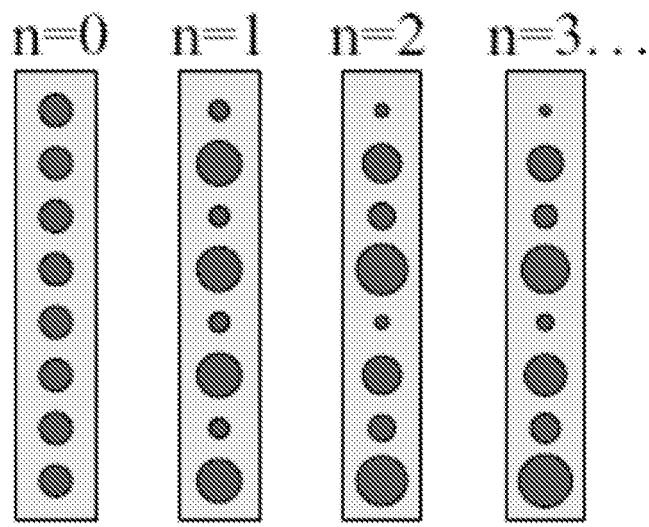
FIG. 3 shows an exemplary construction of increasingly accurate approximations to a fractal structure for a 1-dimensional system.

The waveguide array 100 can be configured to have a plurality of waveguides 102. A detuning process can be performed on the waveguides 102 by adjusting the propagation constant (e.g., by adjusting the refractive index and/or thickness of the core) of each waveguide 102 in order to control the amount of interwaveguide crosstalk that occurs between the waveguides 102 in the waveguide array 100. Detuning between adjacent waveguides 102 can be done by offsetting their propagation constants to reduce the effective strength of interwaveguide coupling. The detuning process can be performed so that all nearest-neighbor pairs in the waveguide array 100 have distinct propagation constants (i.e., the propagation constants of the two sites forming the pair are distinct). For example, for a 1-dimensional waveguide array (with 1-dimensional referring to the dimensionality of the lattice of waveguide locations that results from taking a transverse cross section of the waveguide array), waveguide propagation constants can be chosen to alternate between two values across the sites (waveguides) of the 1-dimensional lattice. This is illustrated in the panel of FIG. 3 labeled by n=1, which shows a cross section of a 1-dimensional exemplary waveguide array with the values of the waveguide propagation constants indicated by the core thickness (i.e., diameter), with the differences in thicknesses exaggerated for clarity. For a k-partite lattice (a lattice for which the sites can be divided into k groups so that every nearest-neighbor pair consists of sites belonging to different groups), k distinct propagation constants can be used. For example, three distinct propagation constants can be used for a triangular lattice since it is three-partite. The detuning process can then be repeated iteratively (i.e., recursively), where waveguides in the waveguide array 100 that have the same propagation constant at the end of the previous iteration are then further detuned in a manner analogous to the detuning process performed in the first iteration. The iterative detuning process can be repeated an arbitrary number of times, where each iteration introduces additional detuning between waveguides separated by increasingly larger spatial scales. For higher iterations, the amount by which the propagation constants are detuned decreases. Higher iterations of this detuning process are illustrated for a 1-dimensional exemplary waveguide array in the panels of FIG. 3 labeled by n≥2 (note that, since higher iterations detune by smaller amounts, the changes in thicknesses become increasingly subtle for larger n). Each iteration of detuning can cause the waveguide array 100 to maintain non-diffuse propagation of light over increasingly larger propagation distances and to cause the configuration of waveguide propagation constants to approach a fractal structure.

The fractal structure is an idealization obtained by iterating the above described detuning procedure infinitely many times. The fractal structure can also be viewed as a structure designed to optimize an objective function (a function, discussed in detail herein, that provides a numerical measure of how well a structure performs according to a certain metric). The fractal structure assigns a propagation constant to each of the waveguides 102 in a way that maximizes localization (spatial confinement) of the eigenstates of the coupled waveguide array 100. In other words, the fractal structure can be designed to optimize the objective function and will maximally confine the eigenstates of the coupled waveguide array 100 (meaning that the eigenstates are tightly confined in space so that light will propagate along the length of the waveguide array 100 in a non-diffuse manner). Since the fractal structure is an idealization, it may not be achievable in an actual waveguide array 100. But, truncating the detuning process after a finite number of iterations can generate a structure in a waveguide array 100 that approximates the fractal structure. Using more detuning iterations yields a better approximation to the fractal and enables the structure to maintain non-diffuse propagation of light over increasingly larger propagation distances.

While exemplary embodiments disclose forming the above described structures in a waveguide array 100, it is contemplated for the methods disclosed herein to be applicable to other mediums. The construction of the structure is not limited to waveguide arrays described by a collection of propagation constants. For instance, the medium can be a lattice structure configured to confine waves (electromagnetic waves, quantum mechanical wavefunctions, or other waves) at predetermined lattice sites. The ideas described herein are applicable to any system that can be described by an underlying lattice of sites that couple to one another and where an on-site energy is assigned to each site of the lattice (i.e., yielding a potential defined on the lattice). The structure can then be formed by applying the recursive detuning procedure disclosed herein to produce a configuration of on-site energies for the system. The procedure for producing the configuration of on-site energies consists of the same iterative method, except that, at each iteration, instead of adjusting the propagation constants of waveguides at different lattice sites, one adjusts the values of the on-site energies associated with different lattice sites using any technique capable of changing the on-site energy.

In some embodiments, the medium can be a waveguide array 100, the waveguide array 100 having a plurality of waveguides 102. Each waveguide 102 can be a core 104 embedded in a surrounding material 106 (i.e., a cladding). The surrounding material 106 can be a single material that surrounds all of the cores 104 within the waveguide array 100. For instance, each waveguide 102 can be a core 104 with a refractive index that differs from the refractive index of the surrounding material 106 in which the core 104 is embedded. The surrounding material 106 can have a refractive index that is either uniform throughout the region not occupied by the cores 104 of the waveguides 102 or a refractive index that varies spatially in this region. Each waveguide 102 can have a waveguide length WL and a shape (e.g., circular, rectangular, etc.). For instance, a waveguide 102 can be tubular (e.g., have a circular cross-sectional shape) with a core 104 running along the waveguide length WL. The waveguide 102 can have a surrounding material 106 that surrounds the core 104 and also runs along the waveguide length WL. Other shapes and configurations can be used.

It is contemplated for the core 104 of a waveguide 102 to have a refractive index that is larger than the refractive index of the surrounding material 106 so as to facilitate confinement of light to the core 104.

Each core 104 of each waveguide 102 can have a core thickness CoreTH and a core refractive index. The surrounding material 106 within which each core 104 is embedded can have a surrounding material refractive index. The refractive index and the thickness of the core 104 for a waveguide 102 combined with the refractive index of the surrounding material dictate the propagation of light through the waveguide 102. For instance, adjustment of the core refractive index and thickness can be done to generate a desired propagation constant for the waveguide 102.

Figure 1:
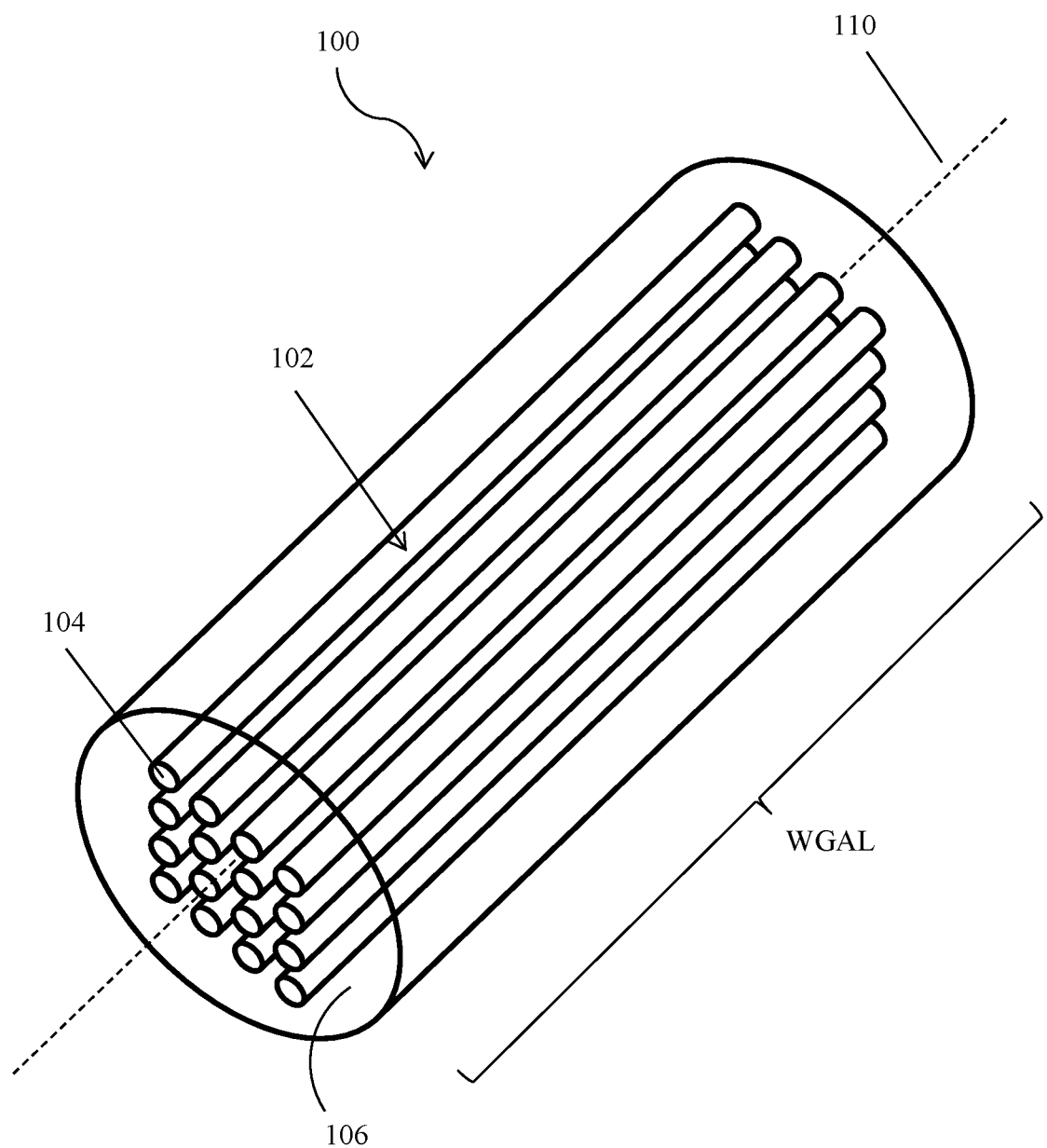
FIG. 1 shows an embodiment of a waveguide array.

FIG. 1 shows an exemplary waveguide array 100. The waveguide array 100 can include a plurality of waveguides 102. The plurality of waveguides 102 can include a first waveguide core 104a, a second waveguide core 104b, etc. It should be noted that the waveguide array 100 shown in FIG. 1 is exemplary and for illustration purposes. In practice, the waveguide array 100 can be a multicore fiber having a plurality of cores 104 embedded in a surrounding material 106, wherein the cores 104 have a refractive index that differs from the refractive index of the surrounding material 106 in which they are embedded. The surrounding material 106 can have a refractive index that is either uniform throughout the region not occupied by the cores 104 or a refractive index that varies spatially in this region. The illustration in FIG. 1 shows sixteen cores 104, and it is understood that each of these cores 104 are embedded in the surrounding material 106. In practice, it is contemplated that more or less than sixteen cores can be used. It is also contemplated that the cores can be positioned in different ways in the transverse plane to form any k-partite lattice that satisfies the property that the k distinct groups each independently have the same structure as the original lattice (i.e., each group can be mapped onto the original lattice by a combination of a uniform scaling, rotation, and translation transformation). For example, the cores could be arranged in a triangular lattice, which constitutes a three-partite case.

Figure 2:
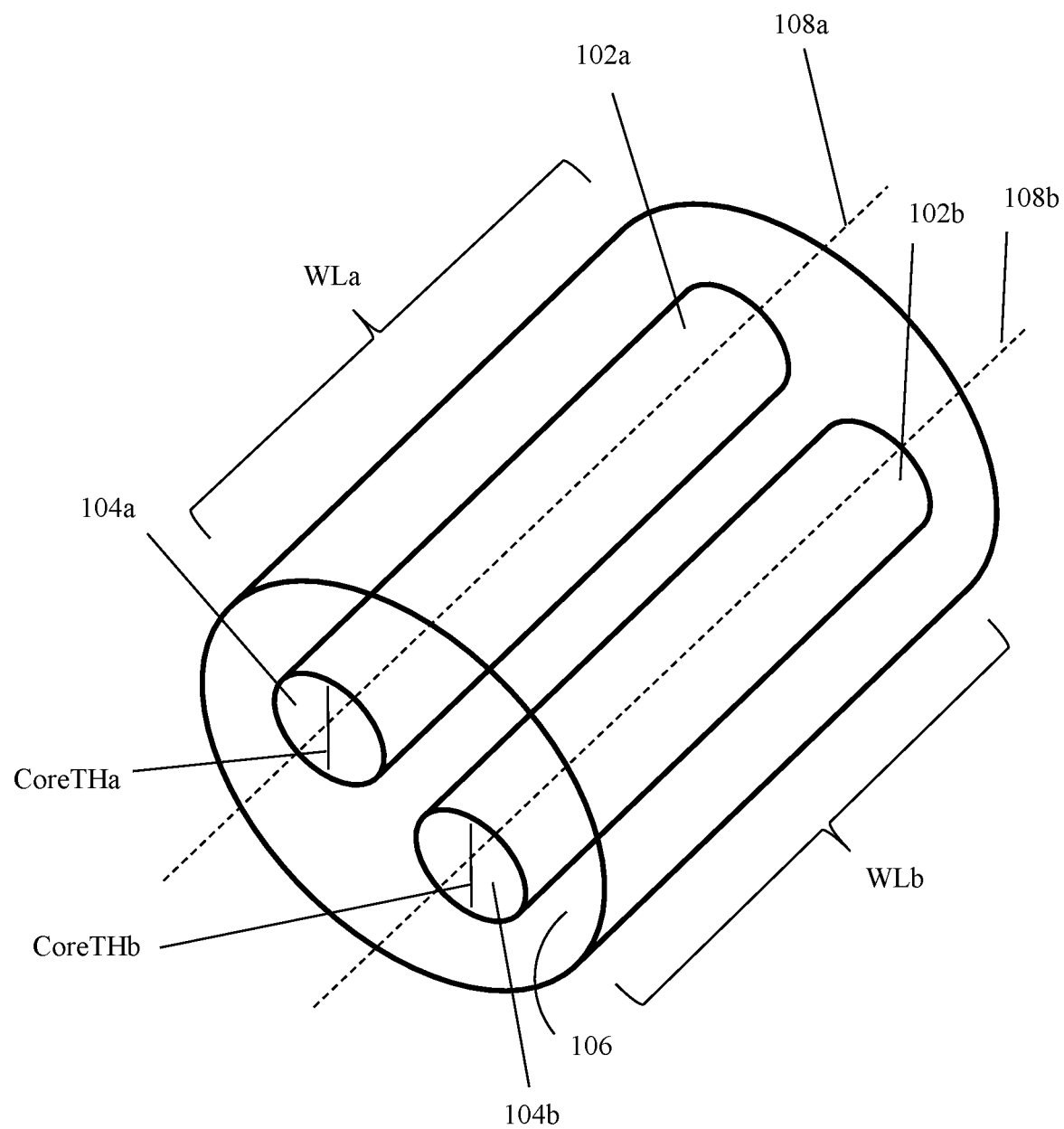
FIG. 2 shows a cut-out portion of an embodiment of the waveguide array, showing two exemplary waveguide cores in the waveguide array.

Again, for illustrative purposes, FIG. 2 (and the following description) relates to two waveguides 102, but it is understood that the waveguide array 100 will comprise more cores 104 in the array.

The first waveguide 102a can have a first core 104a embedded in the surrounding material 106. The first waveguide 102a can have a first waveguide length WLa running along the first waveguide longitudinal axis 108a. The first core 104a can also run along the first waveguide longitudinal axis 108a. The first core 104a can have a first core thickness CoreTHa and a first core refractive index. The surrounding material 106 can have a surrounding material refractive index. The first core refractive index can be higher than the surrounding material refractive index so as to facilitate confinement of light to the first core 104a and guide light to propagate along the first core 104a and along the first waveguide longitudinal axis 108a. The first waveguide 102a can have a first propagation constant defined by the first core thickness CoreTHa, the first core refractive index, and the surrounding material refractive index. The first propagation constant can be adjusted via adjustment of the first core thickness CoreTHa, the first core refractive index, and/or the surrounding material refractive index. These adjustments can be done via known techniques.

The second waveguide 102b can have a second core 104b embedded in the surrounding material 106. The second waveguide 102b can have a second waveguide length WLb running along the second waveguide longitudinal axis 108b. The second core 104b can also run along the second waveguide longitudinal axis 108b. The second core 104b can have a second core thickness CoreTHb and a second core refractive index. The surrounding material 106 can have a surrounding material refractive index. The second core refractive index can be higher than the surrounding material refractive index so as to facilitate confinement of light to the second core 104b and guide light to propagate along the second core 104b and along the second waveguide longitudinal axis 108b. The second waveguide 102b can have a second propagation constant defined by the second core thickness CoreTHb, the second core refractive index, and the surrounding material refractive index. The second propagation constant can be adjusted via adjustment of the second core thickness CoreTHa, the second core refractive index, and/or the second surrounding material refractive index. These adjustments can be done via known techniques.

The first waveguide 102a can be configured to run parallel with the second waveguide 102b in the waveguide array 100. For instance, the waveguide array 100 can have a waveguide array length WGAL running along the waveguide array longitudinal axis 110, in which the first waveguide longitudinal axis 108a, the second waveguide longitudinal axis 108b, and the waveguide array longitudinal axis 110 are all parallel.

Each waveguide 102 can have a propagation constant. For instance, the first waveguide 102a can have a first waveguide propagation constant and the second waveguide 102b can have a second waveguide propagation constant. Again, it is contemplated for the waveguide array 100 to comprise more than two waveguides 102, and thus each waveguide 102 can have a propagation constant.

The waveguide array 100 can be designed so that the waveguides 102 have different propagation constants, yielding a spatially inhomogeneous configuration of propagation constants distributed throughout the transverse plane. The configuration of propagation constants is formed by an iterative detuning process that produces approximations to a fractal structure that possesses localized eigenstates.

As noted herein, the configuration of propagation constants can be formed by detuning the plurality of waveguides 102 in an iterative manner. Each iteration can involve an adjustment of the propagation constant of each waveguide 102. For instance, a detuning process can be done to adjust the first propagation constant (e.g., via adjustment of the first core thickness CoreTHa and/or the first core refractive index), the second propagation constant (e.g., via adjustment of the second core thickness CoreTHb and/or the second core refractive index), and the propagation constants of the other waveguides in the waveguide array 100 (e.g., via adjustments of the other refractive indices and/or thicknesses for the other cores). The propagation constant of an individual waveguide 102 is uniform along the length of the waveguide 102. However, different propagation constants are assigned to different waveguides 102 in the array 100. Thus, while the propagation constant for a single waveguide 102 is uniform along the longitudinal axis of the waveguide 102, the collection of propagation constants for all of the waveguides 102 in the waveguide array 100 is highly non-uniform in the transverse plane (the plane perpendicular to the waveguide propagation axis). In other words, the propagation constants for the plurality of waveguides being non-uniform in the transverse plane means that the propagation constant of one waveguide 102 within the array 100 can be different from another waveguide 102 positioned at a different location in the transverse plane of the array 100.

Figure 5:
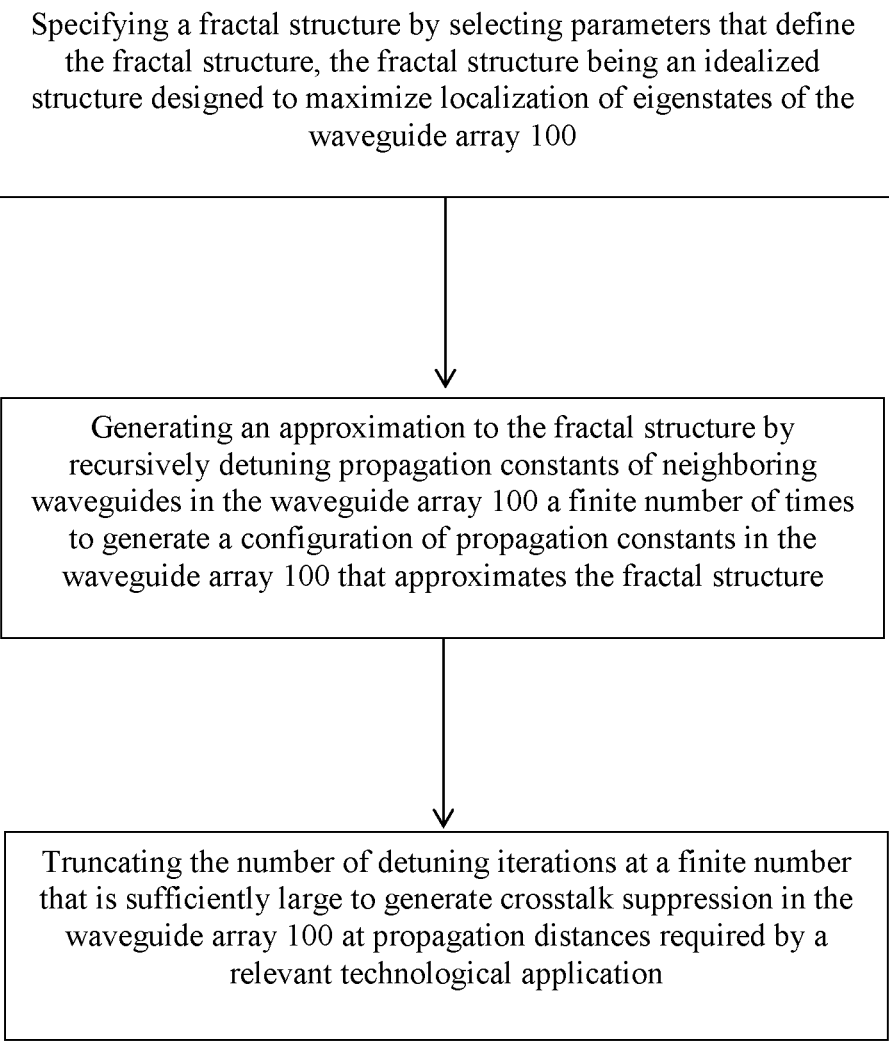
FIG. 5 shows an exemplary process for generating a structure which causes light propagating along the length of the waveguide array to propagate in a non-diffuse manner.

An exemplary method for generating a configuration of propagation constants that maintains non-diffuse propagation of light through a waveguide array 100 is illustrated in FIG. 5 and can involve choosing a specific fractal structure (e.g., by specifying parameters α and V/c that define the fractal and are described later) and then constructing a simpler structure that approximates the fractal. The fractal structure can provide an ideal limiting structure that specifies a procedure by which one can construct better and better approximations that perform increasingly well in the sense of being able to maintain non-diffuse propagation of light over increasingly larger propagation distances. The fractal structure results from applying infinitely many detuning iterations of the type discussed above. An approximation to the fractal can be constructed by truncating the detuning process after finitely many iterations. The performance of the structure that approximates the fractal can be improved by performing more iterations. It is contemplated that the iterative process for generating the configuration of propagation constants can be first performed theoretically (without fabricating a physical manifestation of the propagation constants for every iteration of the procedure), and then the final design obtained from the theoretical process can be fabricated in a physical waveguide array.

Test results for exemplary waveguide arrays 100 and detailed processes for making the exemplary waveguide arrays 100 will be discussed next.

Part of the tests focused on the extent to which localization lengths (which characterize the spatial distance over which the eigenstates are localized) of eigenstates of a waveguide array 100 can be reduced by tailoring the configuration of individual waveguide propagation constants so that a determination can be made as to how the propagation constants should be configured to achieve maximal localization of eigenstates. The tests used an optimization technique in systems having waveguides 102 to locate a set of reference structures that maximally confine eigenstates (i.e., the structures obtained from the numerical optimization provide a baseline measure of ideal performance which can be used as a standard of comparison for other structures). Test results further demonstrate that, in a regime where the range within which propagation constants can be varied is large relative to the interwaveguide coupling, maximal localization can be obtained by constructing a self-similar structure (a fractal structure), created by iteratively detuning the propagation constants of waveguides 102 in the waveguide array 100. By truncating the detuning procedure after a finite number of iterations, structures that approximate the fractal are obtained. Test results also demonstrate the ability of these structures (the structures that approximate the fractal) to suppress crosstalk out to large propagation distances. It will also be demonstrated that the fractal structure can exhibit a localization-delocalization transition (where the eigenstates change from being spatially localized to being spatially delocalized) in both 1-dimensional waveguide arrays 100 and 2-dimensional waveguide arrays 100. This localization-delocalization transition is important in determining the ability of the approximations to the fractal structure to suppress crosstalk at long distances.

The tests begin with a waveguide array 100 that can be modeled using tight-binding theory. The waveguides 102 in the waveguide array 100 were assumed to be single-mode waveguides. For this waveguide system, the on-site energy $V_i$ of each waveguide 102 is defined to be the deviation of the propagation constant of the waveguide 102 from some fixed reference propagation constant value. (This terminology—where the shifts in propagation constant values are referred to as on-site energies—is motivated by the fact that the waveguide system is described by Eq. (1) below, which is similar to the tight-binding Schrödinger equation used to describe condensed matter systems, where for those systems the quantities $V_i$ are associated with a lattice potential and are known as on-site energies. For this reason, we will also refer to the configuration of on-site energies $V_i$ as a potential.) The following tight-binding Schrödinger-type equation was then used to describe the system:

$$i\partial_z \psi_i(z) = \sum_j (c_{ij} + V_i \delta_{ij}) \psi_j(z) \qquad \text{Eq. (1)}$$

where i is a label indicator for the individual waveguides 102 of the structure (on a lattice of arbitrary dimension), $\psi_i$ is the amplitude of the electric field in waveguide i, z is the propagation distance measured along the axial direction of the waveguide array 100, $c_{ij}$ is the coupling constant between sites i and j, and $\delta_{ij}$ is equal to 1 if i=j and is equal to 0 otherwise.

At the input facet of the waveguide array 100, light with an electric field profile $\psi_i$ and intensity amplitude profile $|\psi_i|^2$ can be injected representing input data. The light would then propagate through the structure and produce an output intensity pattern $|\psi'_i|^2$ representing the output data. Due to crosstalk between waveguides, $|\psi'_i|^2$ can in general differ from $|\psi_i|^2$. Part of the testing focused on finding the optimal way to distribute the on-site energies $V_i$ so as to mitigate this crosstalk. In this regard, an objective function (a function that provides a numerical measure of how well a structure performs according to a certain metric) S(z) was defined that measures the degree to which crosstalk is mitigated for light propagating a distance z through the waveguide array (z being measured along the longitudinal axis of the waveguide array 100). To motivate its definition, one can first consider the function:

$$S_0(z) = tr|U(z)|^2 \qquad \text{Eq. (2)}$$

where U(z) is the unitary evolution operator associated with Eq. (1) (that is, $U(z) = e^{-iHz}$ where H is the Hamiltonian matrix with entries $H_{ij} = c_{ij} + V_i \delta_{ij}$) and the absolute value is taken independently for each element of the matrix U(z). The j-th column of the matrix $|U(z)|^2$ gives the output intensity pattern $|\psi'_i|^2$ that would be obtained when using a single-waveguide input excitation where light is injected in waveguide j and then allowed to propagate through a distance z. Hence, the magnitudes of the diagonal entries of $|U(z)|^2$ characterize the degree to which light would be recovered at its injection site after being injected in specific waveguides and then evolving through the structure. Summing over all of the diagonal entries (i.e., taking the matrix trace), one could then seek to maximize $S_0(z)$ (but an improved objective function will be defined below). When $S_0(z)$ takes on its maximal value of N (the total number of waveguides), light injected at any waveguide will appear at the output to be perfectly localized in the same waveguide in which it was injected. Smaller values for $S_0(z)$ indicate that, for input injections into some waveguides, the light recovered at the output will have non-zero overlap with other waveguides.

In general, $tr|U(z)|^2$ can oscillate rapidly as a function of z, so that a solution that is optimal at z may fail to be optimal at a nearby point z+Δz. To avoid this problem, an integral over z was performed so as to capture information about the behavior over the entire interval:

$$S(z) = \frac{1}{Nz}\int_0^z dz' tr|U(z')|^2 \qquad \text{Eq. (3)}$$

The function can be normalized by the number of sites N so that $S(z) \in [0, 1]$, with $S(z)=1$ meaning (for finite z) that light injected at a single site (waveguide) will remain perfectly localized in that waveguide out to propagation distance z; smaller values of $S(z)$ indicate diffusion of light into adjacent waveguides.

For optimization, the infinite propagation distance limit of $S(z)$ was taken (the value of $S(z)$ in this limit characterizes how well the light remains localized at very large propagation distances). In this limit, $S(z)$ bears a close relation to the participation ratios (a measure of localization) of the energy eigenstates of the Hamiltonian H: Assuming the system possesses no degeneracies, the limit is $$\lim_{z \to \infty} S(z) = \langle P_E \rangle \qquad \text{Eq. (4)}$$

where $\langle P_E \rangle$ represents the average of the participation ratios taken over all the energy eigenstates. In particular, given an energy eigenstate $\psi_i^E$ (which satisfies the eigenvalue equation $\Sigma_j H_{ij}\psi_j^E = E\psi_i^E$ and which is assumed to be normalized $\Sigma_i|\psi_i^E|^2 = 1$), the participation ratio associated with this eigenstate is $P_E = \Sigma_i|\psi_i^E|^4$. The quantity $\langle P_E \rangle$ was obtained by averaging such participation ratios over all of the eigenstates of H.

Figure 6:
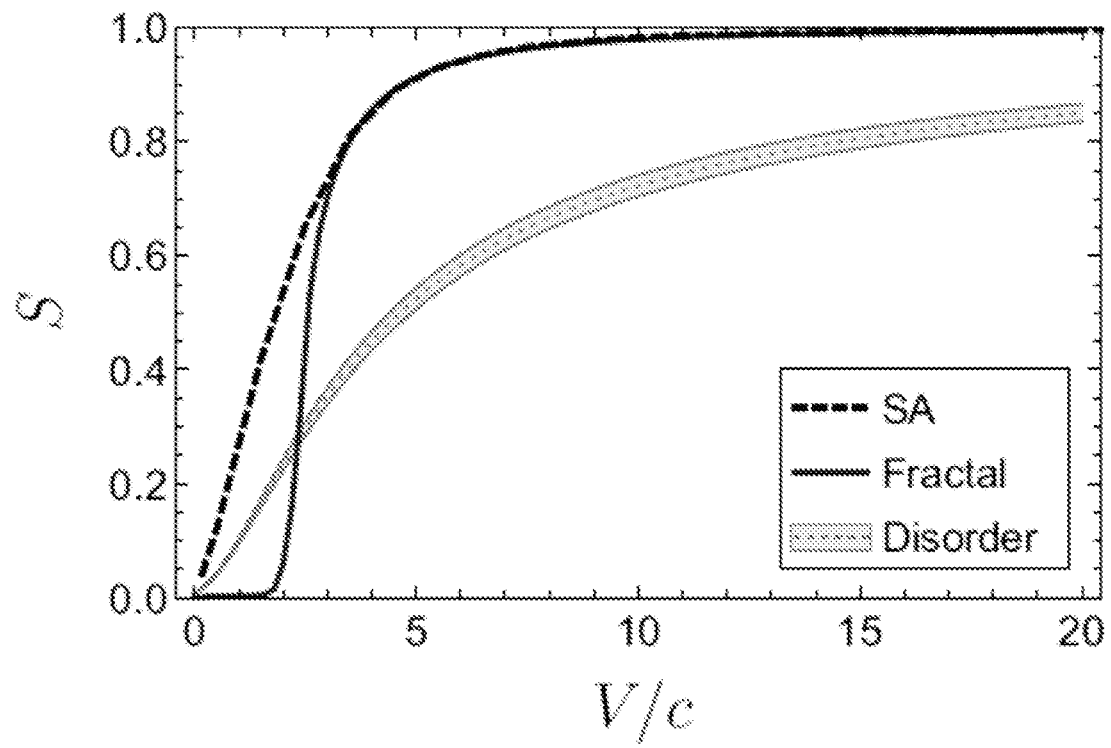
FIG. 6 shows the objective function at $z \to \infty$ (average eigenstate participation ratio) for different propagation constant configurations for a 1-dimensional system.
Figure 7:
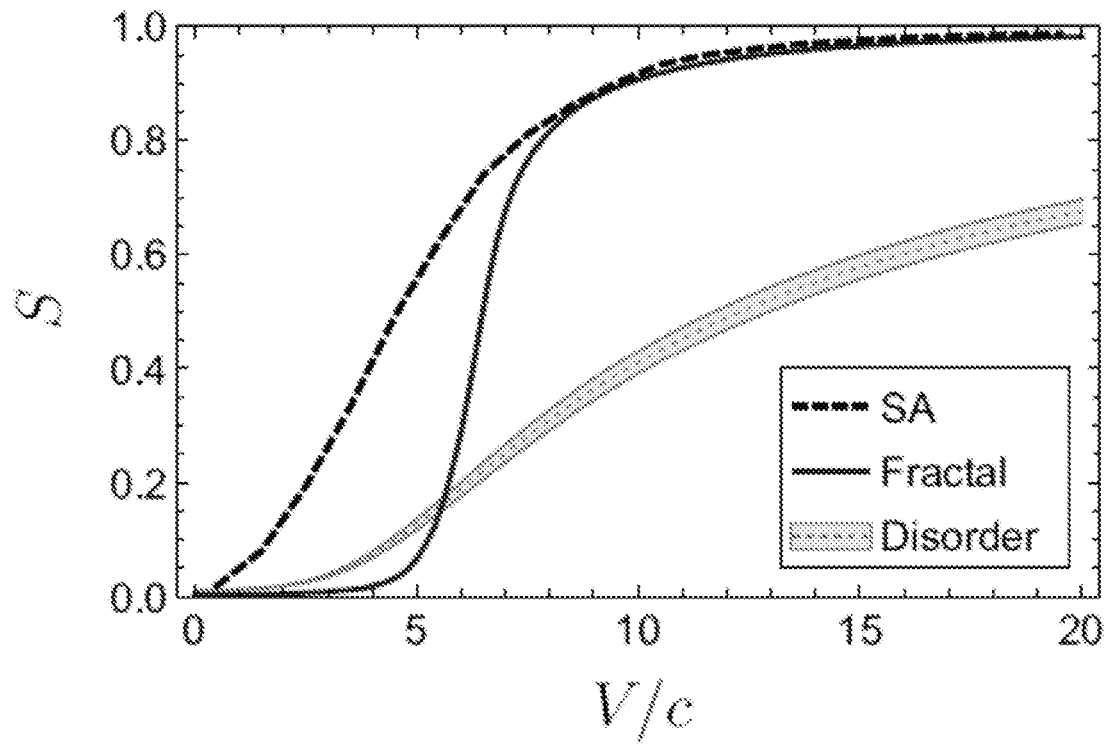
FIG. 7 shows the objective function at $z \to \infty$ (average eigenstate participation ratio) for different propagation constant configurations for a 2-dimensional system.

Optimization of $S(z)$ at $z \to \infty$ was performed using simulated annealing (a numerical optimization algorithm) on a 256-site chain in 1-dimension (1D) and on a 16×16 lattice in 2-dimensions (2D). In both cases, periodic boundary conditions were imposed and only nearest-neighbor couplings c were included. The on-site energies were restricted to lie within a finite interval $[-V,+V]$. Independent optimizations were performed for different values of V. The results of the optimization are shown in FIGS. 6-7, and provide a baseline standard for ideal performance. FIG. 6 shows the objective function at $z \to \infty$ (average eigenstate participation ratio) for different on-site energy configurations for a 1D waveguide array. FIG. 7 shows the objective function at $z \to \infty$ (average eigenstate participation ratio) for different on-site energy configurations for a 2D waveguide array. The SA curve was obtained using simulated annealing to optimize the on-site energies. The disorder curve is provided for reference/comparison and shows the results for on-site disorder averaged over 1000 disorder realizations (e.g., averaged over 1000 different random configurations of on-site energies drawn uniformly from the interval $[-V,+V]$ and assigned to the waveguides), wherein the shaded region corresponds to one standard deviation from the mean. The Fractal curve shows the results for a fractal on-site energy structure using $\alpha=0.25$ and $\alpha=0.36$ for the 1D and 2D cases, respectively (these fractal structures and the parameter $\alpha$ will be described in detail below). In the regime where V/c is large (the regime of strongly detuned waveguides), the fractal structure surpasses disorder in both the 1D and 2D cases and performs comparably to the optimized structures.

The fractal structure was constructed as follows. The fractal structure is defined by an on-site energy scale $V_0$ that controls the strength of the detuning (i.e., the amount by which the propagation constants are varied) and a dimensionless parameter $\alpha \in [0,1/2]$ that controls the magnitude of the detuning applied at higher iteration levels. As the lattice (a 1D linear array or 2D square lattice) can be made to be bipartite (e.g., the lattice sites can be divided into two groups such that group I sites are only nearest neighbors with group II sites), the lattice was subdivided into two sub-lattices to which on-site energies of $\pm V_0$ were assigned. It was then noted that each sub-lattice forms a rescaled copy of the original lattice (where the copies in the 2D case are rotated by $\pi/4$ relative to the original lattice). The detuning procedure discussed above was then independently repeated on each sub-lattice, this time using a smaller detuning of $\pm \alpha V_0$. This process was repeated recursively. At a recursion level n, a detuning by an amount $\pm \alpha^n V_0$ was applied to obtain the structure at level n+1. The fractal structure corresponds to the structure obtained in the limit in which n approaches infinity.

Figure 4:
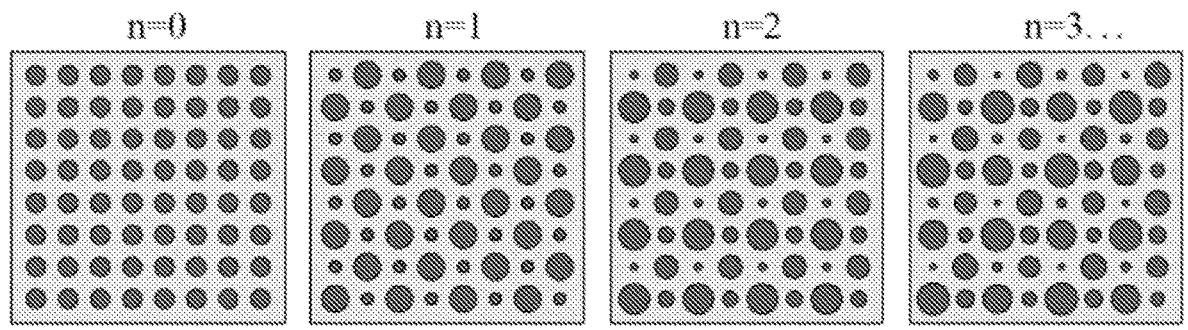
FIG. 4 shows an exemplary construction of increasingly accurate approximations to a fractal structure for a 2-dimensional system.
Figure 8:
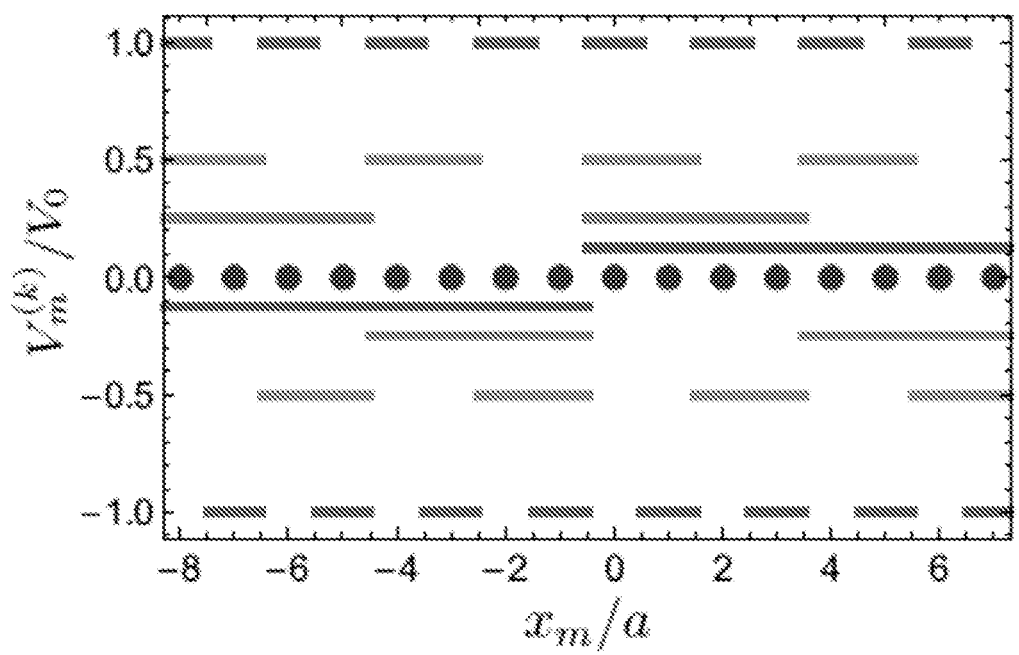
FIG. 8 shows the first four terms of the decomposition of an exemplary 1-dimensional fractal potential (approximations to which are shown in FIG. 3) into square waves, with the sites of the lattice overlaid on the x axis.
Figure 9:
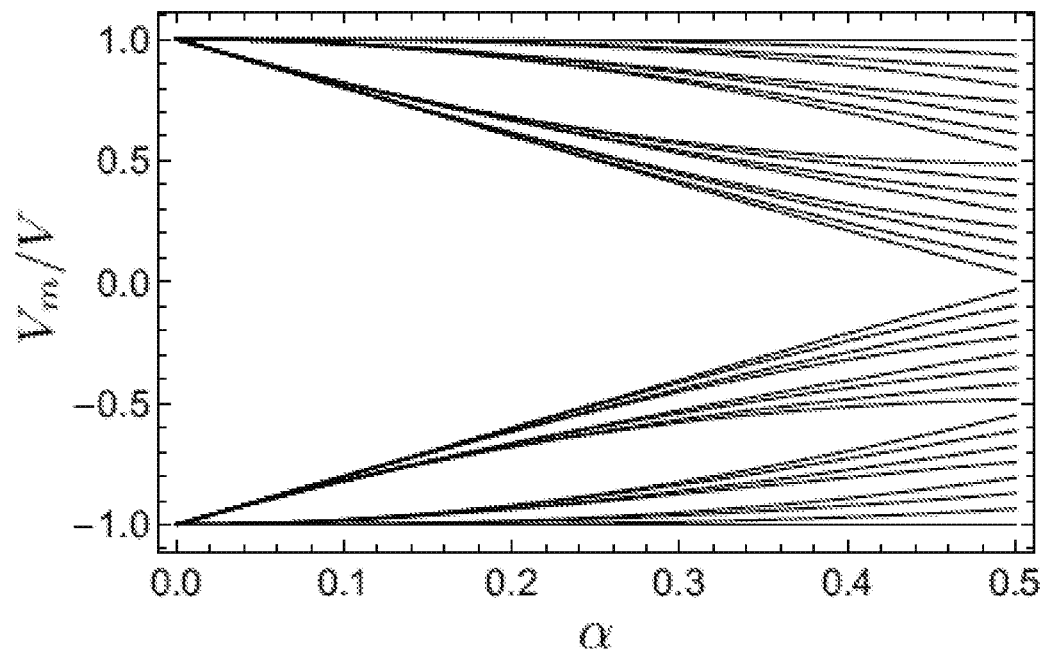
FIG. 9 shows the dependence of on-site energies on the parameter $\alpha$ for a 32-site periodic approximation to a fractal structure.

FIG. 3 shows a construction of an exemplary fractal structure in the 1D case. FIG. 4 shows a construction of an exemplary fractal structure in the 2D case. In FIGS. 3-4, the on-site energies are encoded in the diameters of the circles (with the variation of the diameters exaggerated for clarity). The structures were generated by recursive application of a detuning procedure in which each increase in the recursion level n resulted in an exponentially larger unit cell, with the full fractal structure obtained in the $n \to \infty$ limit. FIG. 8 shows the first four terms of the decomposition of the 1D fractal potential of FIG. 3 into square waves [$V^{(k)}_m$ refers to the kth term in the summation of Eq. (5) below], with the sites of the lattice overlaid on the x axis. FIG. 9 shows the dependence of the on-site energies on the parameter $\alpha$ for a 32-site periodic approximation to the fractal (truncated at n=5). In FIG. 9, the on-site energies at a given $\alpha$ are simply sorted by energy and do not directly correspond to locations on the lattice. The on-site energies in this plot were normalized by the full range of the on-site energies appearing in this periodic approximation.

The fractal structure has on-site energies contained in the interval $[-V,+V]$, where $V=V_0/(1-\alpha)$. In the 1D case, the on-site energies for the fractal structure can be written as $$V_{in} = V_0 \sum_{k=0}^{\infty} \alpha^k s\left(\frac{m+1/2}{2^{k+1}}\right) \qquad \text{Eq. (5)}$$

where $s(x)$ is an odd, unit-period square wave that alternates between $\pm 1$. In Eq. (5), the potential was evaluated at site $x_m=ma$, where a is the nearest-neighbor spacing. In the 2D case, the on-site energies for the fractal structure can similarly be written $$V_{mn} = V_0 \sum_{k=0}^{\infty} \left[\alpha^{2k} s\left(\frac{m+1/2}{2^{k+1}}\right) + \alpha^{2k+1} s\left(\frac{n+1/2}{2^{k+1}}\right)\right] \qquad \text{Eq. (6)}$$

where the pair of indices on $V_{mn}$ indicates that the potential has been evaluated at site $x_{mn}=mR_1+nR_2$ with $R_1=a(1, 0)$ and $R_2=a(1, 1)$.

As noted above, the objective function plots for these structures show that, in the regime of strong detuning, they perform comparably to the optimized results from simulated annealing. It should be noted that the system size had been increased in producing the plots for these structures to a 1024-site chain in 1D and a 32×32 structure in 2D to demonstrate that the fractal model achieves optimal performance for system sizes beyond that used in the optimization. As before, periodic boundary conditions were imposed at the system's edges. In the regime of nearly perfect localization (S~1), the fractal yields an order of magnitude improvement over disorder in terms of the detuning strength required to generate such strong localization. For example, an objective function value of S=0.98 is achieved by the 1D fractal at V/c~10 and by the 2D fractal at V/c~20. In contrast, achieving this value, on average, using disorder requires V/c>100 in both 1D and 2D.

A useful feature of the fractal structures arises from their construction via a series of simpler periodic structures that approximate the fractal structure and are labeled by the recursion level n at which the construction of the fractal is terminated. In particular, these periodic structures are obtained by using the same iterative detuning procedure described above, but only applying a finite number of detuning iterations n. (Each such structure truncated after a finite number of detuning iterations, n, is periodic if the underlying lattice on which it is constructed is assumed to be arbitrarily large—notice, for instance, how the n=1 structure in FIG. 3 repeats. If the underlying lattice is finite, the structure will be effectively periodic up to the boundaries of the lattice.) These structures suppress diffraction out to a propagation distance that diverges rapidly with n. The complexity of the structure can therefore be tailored to the total propagation distance required by a given application, with larger values of n being better suited for applications that require larger propagation distances—a feature that could find use for crosstalk reduction in spatially multiplexed fibers for use in long-distance data transmission. The limiting fractal structures thus provide a direct recipe for designing structures that suppress crosstalk at a given propagation distance.

Figure 10:
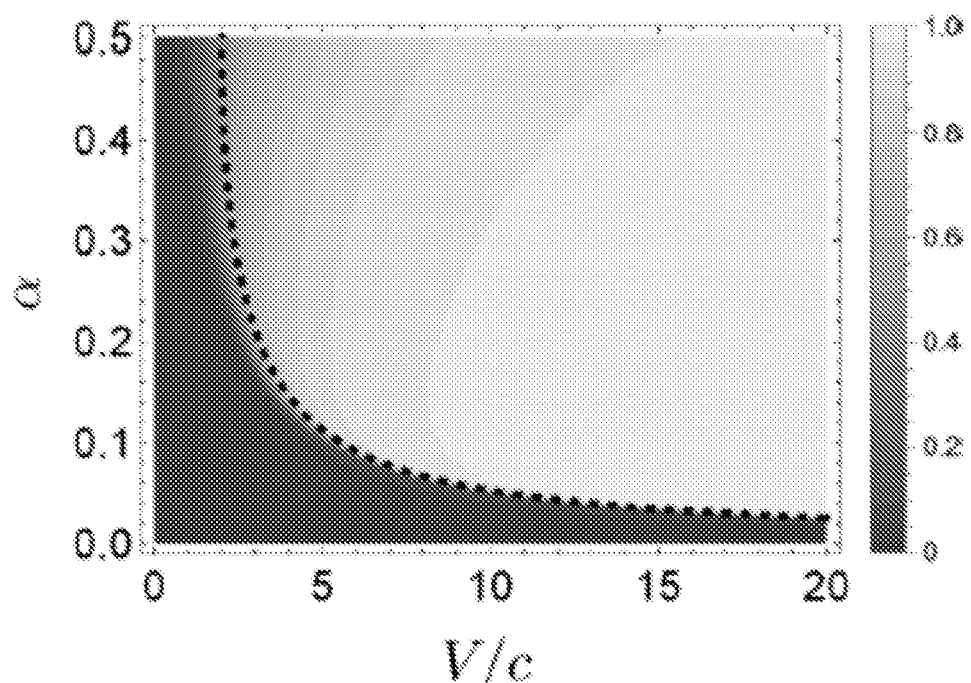
FIG. 10 shows the average eigenstate participation ratio as a function of V/c and $\alpha$ for a 1-dimensional fractal structure.
Figure 11:
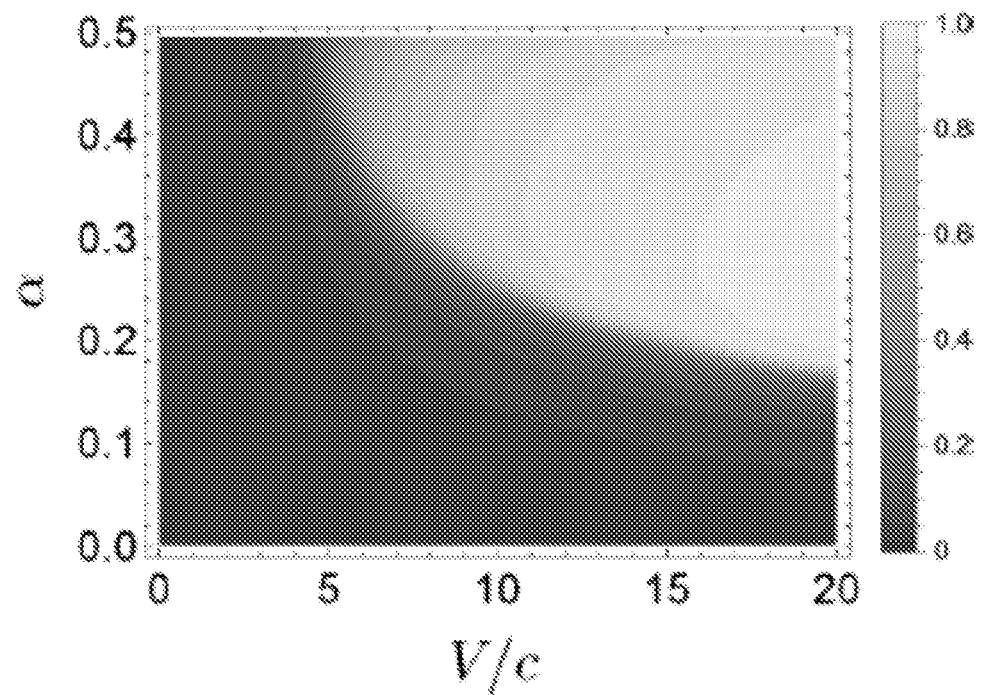
FIG. 11 shows the average eigenstate participation ratio as a function of V/c and $\alpha$ for a 2-dimensional fractal structure.

To further study the localization properties of the fractal structures, FIGS. 10-11 show the average eigenstate participation ratio as a function of V/c and $\alpha$, where the average eigenstate participation ratio for the 1D fractal structure is plotted in FIG. 10 and the 2D fractal structure in FIG. 11 (in the 1D case, the dashed line shows an analytical approximation to the phase transition boundary for the localization-delocalization phase transition discussed below). Average eigenstate participation ratio values closer to 1 indicate increasingly strong localization. The sharp transition at which the average eigenstate participation ratio rapidly increases indicates a phase transition in which the eigenstates go from being spatially extended to being spatially localized. A 1024-site chain and a 32×32-site grid were used for the 1D and 2D structures, respectively. The existence of this localization-delocalization phase transition affects the ability of the periodic approximations to suppress crosstalk at long distances. In particular, introducing additional detuning iterations (i.e., increasing n) can generate significant improvements (in terms of being able to suppress crosstalk at increasingly larger propagation distances) if the parameters defining the fractal structure reside in the localized phase. If the parameters reside outside of the localized phase, the effect of introducing additional detuning iterations will be much less significant.

The construction of the fractal structures (and their periodic approximations) can be generalized to any k-partite lattice that satisfies the property that the k independent sub-lattices form rescaled (and possibly rotated or translated) copies of the original lattice. The two fractal potentials described above constitute a k=2 case since both the 1D array and 2D square lattice can be partitioned so as to be bipartite. A triangular lattice is an example of a k=3 case. The construction on a k-partite lattice proceeds analogously to the bipartite case. The construction can begin by choosing an on-site energy scale $V_0$ and a parameter $\alpha \in [0, 1/k]$. The interval $[-V_0, +V_0]$ can be divided into k equally spaced on-site energies $\{v_1, \ldots, v_k\}$, where these on-site energies can be assigned to the k sub-lattices so as to detune neighboring sites. This constitutes the n=1 level structure. To generate the n=2 level structure, this procedure is repeated independently on each sub-lattice, but this time by detuning over a smaller interval $[v_i - \alpha V_0, v_i + \alpha V_0]$ centered on the $v_i$ associated with the respective sub-lattice. This process is iterated infinitely many times to yield the final fractal structure.

In practice, implementations of an on-site energy configuration will be subject to restrictions on the number of distinct on-site energies (e.g., propagation constants) that are available within fabrication tolerances. Perturbations (e.g., higher-neighbor couplings and disorder) act as additional restraints. The following tests demonstrate how the structure can be implemented with a constrained set of available on-site energies. The tests also demonstrate the effects of perturbations.

Figure 12:
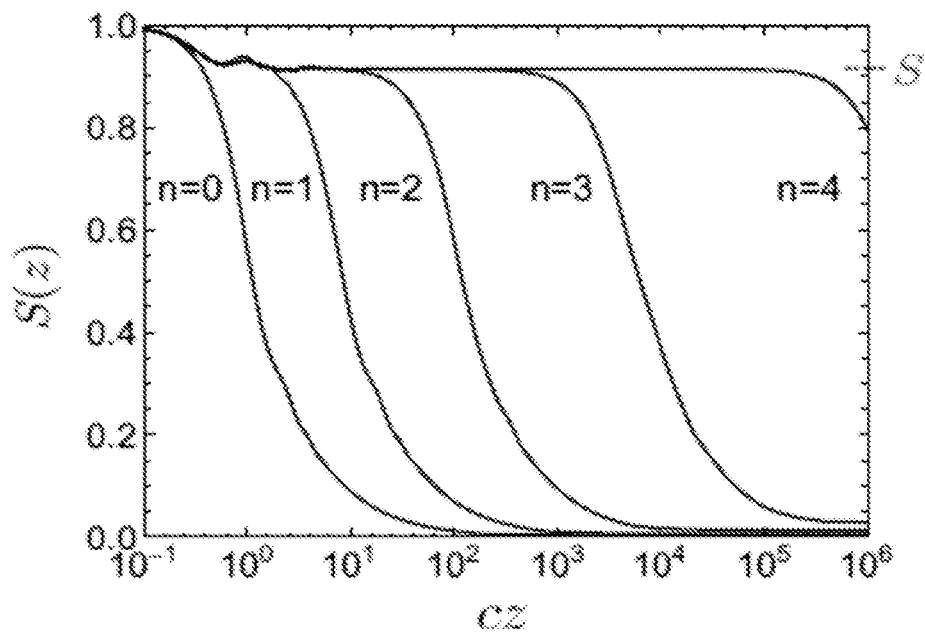
FIG. 12 shows the behavior of periodic truncations of an exemplary 1-dimensional fractal structure for a finite z objective function plotted with $\alpha=0.25$ and V/c=5 (parameters which, for the full fractal structure, yield a localized phase) truncated after various numbers of detuning iterations n.

As discussed earlier, since the fractal structure is constructed via a recursive series of detuning operations—each yielding a larger unit cell requiring a larger but finite number of distinct on-site energies—it provides a natural set of periodic structures that can be used to approximate the full fractal structure and that can be constructed in the presence of restrictions on the number of distinct on-site energies that can be fabricated. These structures can be characterized based on the maximal propagation distance at which they are able to suppress crosstalk. As the truncated structures are periodic, the eigenstates will be extended (by Bloch's theorem) and the corresponding value of $\lim_{z \to \infty} S(z)$ vanishes. As a result, a different metric is necessary to study the periodic truncations. Thus, the criteria can be relaxed to evaluate S(z) at finite propagation distance. Defining $S \equiv \lim_{z \to \infty} S(z)$ evaluated for the full fractal, a given periodic truncation will produce a function S(z) that approximately follows the value S out to some critical propagation distance, which we will call $z_0$, beyond which it approaches zero. This effect is demonstrated in FIG. 12, where S(z) is plotted for 1D periodic structures (that form approximations to the fractal structure defined by $\alpha=0.25$ and V/c=5) constructed by truncating the iterative detuning procedure at levels n=0, ..., 4. Beyond $z_0$, the periodic structure fails to effectively suppress crosstalk, as indicated in FIG. 12 by a sharp reduction in the value of the objective function. The propagation distance $z_0$ at which this occurs can be increased by increasing n. The behavior in the 2D case is similar.

Figure 13:
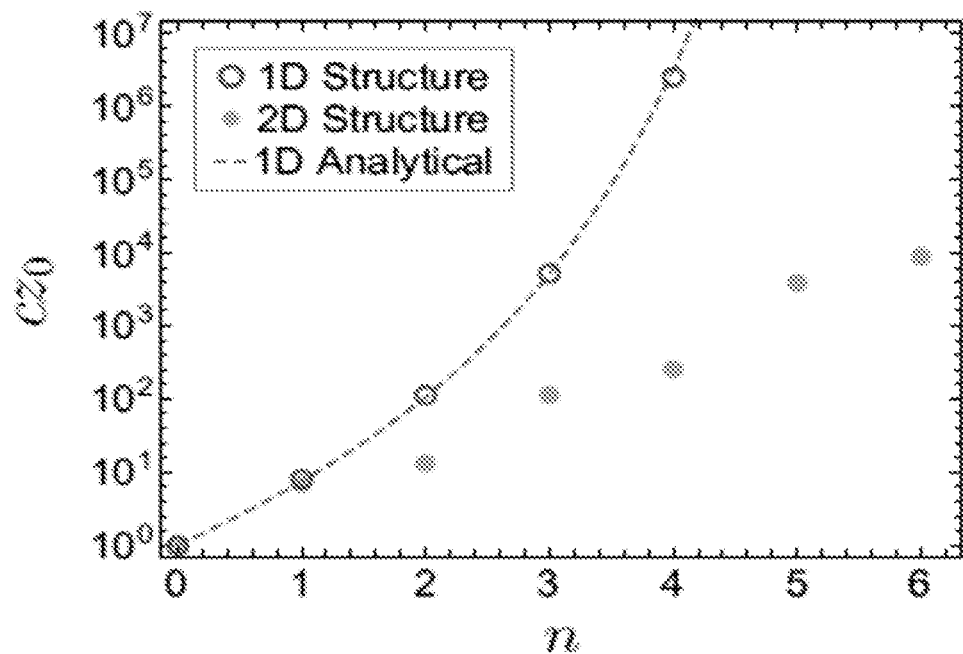
FIG. 13 shows the dependence of $z_0$ (the propagation distance at which the periodic approximation to the fractal begins to fail to suppress crosstalk) on n for a 1-dimensional structure defined by parameters used in FIG. 12 and a 2-dimensional structure defined by parameters $\alpha=0.36$ and V/c=10.

FIG. 13 shows the dependence of $z_0$ (details of its calculation follow below) on n for the 1D periodic structures of FIG. 12 and a set of 2D periodic structures constructed to approximate a 2D fractal structure defined by parameters $\alpha=0.36$ and V/c=10 (in the 1D case, the dashed curve shows an analytical approximation for $z_0$).

The propagation distance $z_0$ at which the objective function curve exhibits a sharp reduction can be understood as the coupling length scale of diffraction associated with the average width of the $2^n$ individual bands of the periodic system (i.e., by interpreting the average bandwidth $\Delta E_{avg}$ in terms of an effective coupling $c_{eff}$ via $\Delta E_{avg} = 4c_{eff}$ for the 1D array and $\Delta E_{avg} = 8c_{eff}$ for the 2D square lattice, and then computing an associated coupling length scale $z_0 \sim 1/c_{eff}$). $z_0$, as extracted from the average bandwidth, as a function of n for both the 1D and 2D cases is plotted in FIG. 13. It can be seen that increasing the level n of the truncation results in a drastic increase in the distance over which the structure is capable of suppressing crosstalk. In the 1D case, an analytical approximation can be obtained for this distance. Defining $N \equiv 2^n$ as the number of sites in the unit cell after n detuning operations (and assuming parameters that map to a localized phase), the effective coupling c(N) that governs $z_0$ (via $z_0 \sim 1/c(N)$) takes the form $c(N)=ce^{-\gamma(N-1)}/N^\beta$ with $\gamma=\ln(2\alpha V_0/c)$, $\beta=\log_2(1/\alpha)$, and c the nearest-neighbor coupling between waveguides. The associated length scale is then $z_0 \sim 1/c(N)$, which is plotted in FIG. 13 as a dashed line. Note that in the above approximation, the distance over which crosstalk is suppressed scales exponentially in N but only as a power law in $V_0$, demonstrating the sense in which it can be more effective to increase the structure's complexity (i.e., increase the size N of the unit cell to produce a better approximation to the fractal) instead of merely increasing the strength of the detuning $V_0$.

Figure 14:
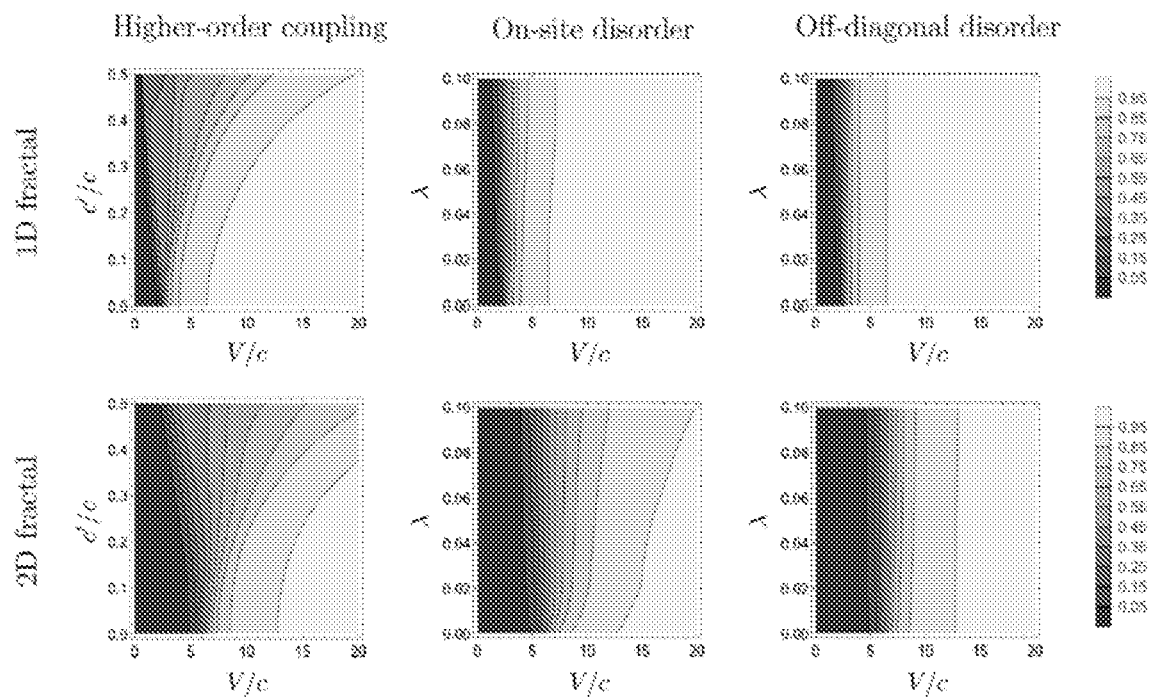
FIG. 14 shows dependence of the objective function on various types of perturbations introduced to an exemplary fractal structure.

Referring to FIG. 14, the introduction of disorder and higher-order couplings to an exemplary fractal structure, and how it affects the resulting localization, is analyzed. To study the effect of higher-order couplings, an exponential model, $c(r)=A \exp(-\gamma r)$, was assumed to govern the dependence of the interwaveguide couplings on separation distance r. Note that for a model of this form, once both first-neighbor and second-neighbor couplings have been specified, all other higher-order couplings are determined since the model contains only two free parameters A and $\gamma$. Thus, in the computations, the first two orders of couplings were specified and then all higher-order couplings were included in accordance with the exponential model. In the first column of FIG. 14, the objective function S for the fractal structure as a function of V/c and c'/c is plotted, where c and c' are the first-neighbor and second-neighbor couplings, respectively, and V is the strength of the potential (the magnitude of the largest on-site energy in the structure). The plots are shaded according to the value of the objective function S, and constant S contours are drawn as solid lines. The upper and lower rows show the results for the 1D fractal and 2D fractal, respectively. In producing the plots for the 1D and 2D structures, $\alpha=0.25$ and $\alpha=0.36$ were used, respectively. Note that taking the horizontal cut c'/c=0 through the plot yields the objective function curves shown in FIG. 6 and FIG. 7, where higher-neighbor couplings are turned off.

In studying the effect of disorder (arising from fabrication imperfections, for example) on the fractal, both on-site disorder (e.g., imperfections in the propagation constants) and off-diagonal disorder (e.g., perturbations to the couplings) were separately considered. In the case of on-site disorder, each on-site energy was perturbed by an energy drawn uniformly from the interval $[-\lambda V, +\lambda V]$, where V is the strength of the unperturbed potential and $\lambda$ is a factor that determines the relative strength of the disorder. $\lambda$ in the range $\lambda \in [0, 0.10]$ was considered during the analysis. At each $\lambda$, the objective function averaged over 250 disorder realizations was computed using only nearest-neighbor couplings. The results are shown in the second column of FIG. 14. An analogous calculation for the case of off-diagonal disorder was also performed. In that scenario, the interwaveguide couplings were randomly perturbed by an amount drawn uniformly from the interval $[-\lambda c, +\lambda c]$ and, as before, the objective function was computed as averaged over 250 disorder realizations.

As a concrete example utilizing the above results on the effect of perturbations on the performance of the fractal structure, consider a typical single-mode waveguide operating at a wavelength of 1550 nm where the cladding index is $n_0=1.5$, the index of the core is $n_0+\delta_n$ with index contrast $\delta_n=3.0\times10^{-3}$, and the core diameter is 8 μm. If the core diameter is assumed to be varied over ±2 μm, this yields an available on-site energy range of ±18 cm$^{-1}$ to be used in constructing the fractal structure. A 2% fabrication error in the waveguide diameters will introduce on-site disorder in the range ±1.5 cm$^{-1}$, yielding a relative disorder strength of approximately 10%. Taking the 2D fractal as an example, this shifts the strength of the potential required to obtain an objective function value of S=0.95 from approximately V/c=13 to V/c=20 (see the second column of FIG. 14). For second-neighbor couplings with amplitudes of less than 20% of the nearest-neighbor couplings, the value of V/c mentioned above remains nearly unchanged (see the first column of FIG. 14). Similarly, the introduction of random variations in the coupling amplitudes on the scale of 10% of the unperturbed couplings has little effect on the structure's performance, with V/c=13 continuing to yield an objective function value of S=0.95 (see the third column of FIG. 14).

It should be noted that the objective function value S associated with the full fractal structure provides information about the performance of the periodic structures that approximate the fractal. In the regime with localized eigenstates (i.e., for a fractal structure specified by parameters that place the system in the localized phase of FIGS. 10 and 11), the value of S may be intuitively thought of as restricting the radius within which crosstalk can occur, where the radius shrinks to zero as S increases. For the full fractal structure, this radius of restriction applies even out to infinite propagation distance. For the periodic structures, the value of S is effectively inherited from the full fractal, but only out to a finite propagation distance $z_0$. This inherited value provides the periodic structures with the same crosstalk-restricting radius, but only for propagation distances less than $z_0$, which is in turn determined by n. The periodic structures are therefore characterized by a pair of quantities (S, n). The quantity S determines the degree to which light will remain localized around its injection site, and it can be increased by increasing the strength of the detuning. The quantity n determines the maximal propagation distance at which this degree of localization can be maintained, and it can be increased by introducing higher levels of detuning that increase the structure's complexity and that produce a better approximation to the full fractal structure.

Figure 15:
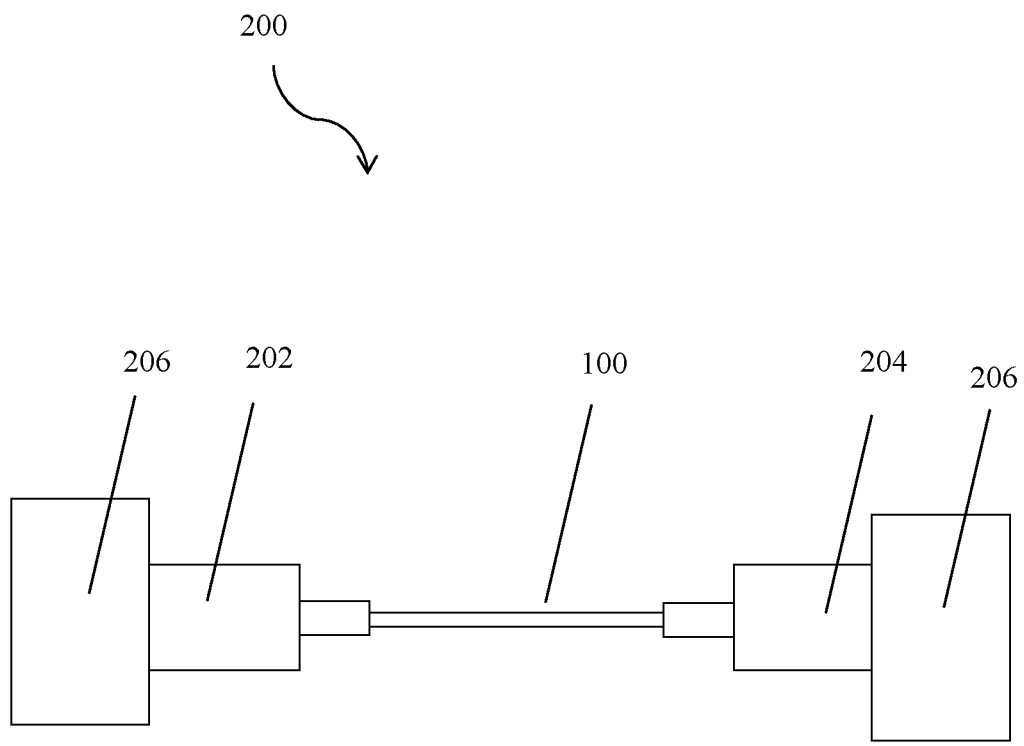
FIG. 15 shows an exemplary communication system that can be generated using an embodiment of the waveguide array.

Referring to FIG. 15, in one exemplary embodiment, an embodiment of the waveguide array 100 can be used in a communication system 200. The communication system 200 can be an optical communication system. For instance, the communication system 200 can be a telecommunication system or an imaging system configured for data transmission. The communication system 200 can include a data transmitter 202 coupled to a first end of an embodiment of the waveguide array 100 and a data receiver 204 coupled to a second end of the waveguide array 100. The data transmitter 202 can include an optical emission device (e.g., a laser or light emitting diode) configured to output light having an operating bandwidth. The output of the data transmitter 202 can be in the form of light signals that are caused to propagate through the waveguide array 100 by entering the first end of the waveguide array 100. The waveguide array 100 can be a spatially multiplexed optical fiber, for example. The data receiver 204 can include control optics and other circuitry to receive and process the light signals from the second end of the waveguide array 100. The waveguide array 100 can be designed so that the configuration of propagation constants of the waveguides 102 is a configuration that can be obtained by the recursive detuning procedure described herein, thus reducing or eliminating crosstalk between waveguides 102 in the waveguide array 100. Any one or combination of the data transmitter 202 and the data receiver 204 can be part of or in connection with a processing unit 206 (e.g., an imaging device, an amplifier, a router, a multiplexer, a television, etc.).

Additional understanding of the disclosed system and methods of use can be obtained from "Inducing Maximal Localization with Fractal Waveguide Arrays", by Jonathan Guglielmon and Mikael C. Rechtsman. PHYSICAL REVIEW A 99, 063807 (2019), available at https://doi.org/10.1103/PhysRevA.99.063807, which is incorporated herein by reference in its entirety.

It should be understood that modifications to the embodiments disclosed herein can be made to meet a particular set of design criteria. For instance, the number of or configuration of components or parameters may be used to meet a particular objective.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. For instance, it is contemplated that a particular feature described, either individually or as part of an embodiment, can be combined with other individually described features, or parts of other embodiments. The elements and acts of the various embodiments described herein can therefore be combined to provide further embodiments.

It is the intent to cover all such modifications and alternative embodiments as may come within the true scope of this invention, which is to be given the full breadth thereof. Additionally, the disclosure of a range of values is a disclosure of every numerical value within that range, including the end points. Thus, while certain exemplary embodiments of apparatuses and methods of making and using the same have been discussed and illustrated herein, it is to be distinctly understood that the invention is not limited thereto but may be otherwise variously embodied and practiced within the scope of the following claims.

What is claimed is:

1. A waveguide array, comprising:
  a plurality of waveguides, wherein:
    each waveguide comprises a core embedded in a cladding adjacent the core;
    each waveguide has a waveguide length and a waveguide propagation constant, the waveguide propagation constant for each waveguide being defined by any one or combination of a refractive index of the core, a thickness of the core, and a refractive index of the cladding; and
    the plurality of waveguides includes a configuration of waveguide propagation constants formed by adjusting the propagation constants of the plurality of waveguides iteratively until the configuration of waveguide propagation constants approach a fractal structure that maximizes localization of the eigenstates of each waveguide array, the configuration of waveguide propagation constants being formed in a plane transverse to a length of the wavelength array, and each of the propagation constants in the configuration being uniform along a length of the waveguide array so as to cause light propagating along the length of the waveguide array to propagate in a non-diffuse manner.

2. The waveguide array recited in claim 1, wherein the plurality of waveguides comprises at least three waveguides.

3. A communication system, comprising:
  a data transmitter;
  a waveguide array coupled to the data transmitter, the waveguide array comprising, a plurality of waveguides, wherein:
    each waveguide comprises a core embedded in a cladding adjacent the core;
    each waveguide has a waveguide length and a waveguide propagation constant, the waveguide propagation constant for each waveguide being defined by any one or combination of a refractive index of the core, a thickness of the core, and a refractive index of the cladding; and
    the plurality of waveguides includes a configuration of waveguide propagation constants formed by adjusting the propagation constants of the plurality of waveguides iteratively until the configuration of waveguide propagation constants approach a fractal structure that maximizes localization of the eigenstates of each waveguide array, the configuration of waveguide propagation constants being formed in a plane transverse to a length of the wavelength array, and each of the propagation constants in the configuration being uniform along a length of the waveguide array so as to cause light propagating along the length of the waveguide array to propagate in a non-diffuse manner; and,
  a data receiver coupled to the waveguide array.

* * * * *